United States Patent
Boivin et al.

(12)

(10) Patent No.: US 6,212,653 B1
(45) Date of Patent: Apr. 3, 2001

(54) LOGGING OF EVENTS FOR A STATE DRIVEN MACHINE

(75) Inventors: Eric Boivin, Laval; Hanan Ahmed, Pierrefords; Francois Prud'Homme, Ile Bizard; Vince Ragosta, Montreal, all of (CA)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/025,169

(22) Filed: Feb. 18, 1998

(51) Int. Cl.[7] ...................................................... G06F 11/34
(52) U.S. Cl. ................................ 714/45; 714/39; 714/723
(58) Field of Search .................................. 714/39–45, 47, 714/20, 49, 50, 51, 723; 712/240

(56) References Cited

U.S. PATENT DOCUMENTS

| | | |
|---|---|---|
| 4,464,543 | 8/1984 | Kline et al. . |
| 4,727,575 | 2/1988 | Hansen et al. . |
| 5,067,099 | 11/1991 | McCown et al. . |
| 5,128,885 | 7/1992 | Janis et al. . |
| 5,155,842 | 10/1992 | Rubin . |
| 5,159,685 | 10/1992 | Kung . |
| 5,170,464 * | 12/1992 | Hayes et al. ............................ 395/76 |
| 5,337,320 | 8/1994 | Kung . |
| 5,379,427 | 1/1995 | Hiroshima . |
| 5,386,464 * | 1/1995 | Pruitt ..................................... 379/201 |
| 5,428,618 * | 6/1995 | Ueki et al. ............................... 371/19 |
| 5,434,845 | 7/1995 | Miller . |
| 5,450,439 | 9/1995 | Kato et al. . |
| 5,463,768 | 10/1995 | Cuddihy et al. . |
| 5,533,193 * | 7/1996 | Roscoe ............................... 395/183.15 |
| 5,740,236 * | 4/1998 | Pruitt ..................................... 379/201 |
| 5,819,094 * | 10/1998 | Sato et al. ............................... 395/704 |
| 5,940,839 * | 8/1999 | Chen et al. ............................. 707/202 |
| 6,009,269 * | 12/1999 | Burrows et al. ....................... 395/704 |
| 6,041,425 * | 3/2000 | Kokunishi et al. ..................... 714/37 |

OTHER PUBLICATIONS

Borland, *Tools & Utilities Guide,* Chapter 5, "Using WinSight" pp. 83–95.

Sun Release 4.1, "User Commands–Trace (1)", Aug. 8, 1989, pp. 1–2.

Sun Release 4.1, "User Commands–DBX(1)", Dec. 6, 1989, pp. 1–14.

* cited by examiner

*Primary Examiner*—Robert Beausoleil
*Assistant Examiner*—Scott Badesman
(74) *Attorney, Agent, or Firm*—Jenkens & Gilchrist

(57) ABSTRACT

In a state driven machine logically sub-divided into a plurality of blocks, with each block including a sub-set of a total number of process defining operating states and transition paths, plural records each relating to a certain execution are associated with each block. A log is maintained on a per execution basis of events (such as state transitions and actions) which occur for that execution. In one implementation, the log is maintained in each record to store events occurring for the certain execution within the block associated with that record. In another implementation, the log is maintained to store events occurring for the certain execution across all implicated blocks. Using the information stored in the log, it is possible to trace back along process execution to identify an origin of a fault in the process implemented by the state driven machine.

11 Claims, 2 Drawing Sheets

LOGGING OF EVENTS FOR A STATE DRIVEN MACHINE

BACKGROUND OF THE INVENTION

1. Technical Field of the Invention

The present invention relates to state driven machines and, in particular, to monitoring state driven machine operation for purposes of trouble-shooting faults, logging events, and post processing of event data for other system operation and maintenance purposes.

2. Description of Related Art

The one or more processes implemented by a system are often designed and represented in a manner well known to those skilled in the art as state driven machines. In this context, a given process may implicate a number of potential states. At each state, the process performs a certain action(s), test(s) or the like, with the result or results therefrom dictating the next state to which the process should transition. There may be more than one transition path into a state, as well as more than one transition path out of a state. Thus, for example, a state "A" may test whether a certain variable matches a predetermined value or a certain signal (or an external action) is received. If yes, the process transitions to state "B". Otherwise, the process transitions to state "C". Alternatively, no transition may occur. In each of state "B" or state "C", another action, test, or the like, occurs resulting perhaps in another transition to yet another state (which may also include a transition back to state "A").

As these state driven machines become more and more complex, additional instances of faults arise. In some instances, these faults result in the hanging of the process. A hanging scenario refers to a fault where the process enters a certain state and conditions requisite for executing within the state or exiting from the state are never met. For example, the process may enter a state and wait for a certain action that will never arrive in a process situation where that action is needed in order to perform a certain task or move on to another state. If blocks (comprising software units) for the process are state driven, a hanging scenario further refers to a fault where the process enters a certain block in a certain state and the conditions requisite for exiting from the block or its state are never met. When a hanging or other fault occurs, some recovery with continued operation may be possible, but it often becomes necessary to simply restart, reset or reinitialize the system.

Once an occurrence of a fault arises and is recognized, it becomes vitally important to the system operator that the cause of the fault be rapidly discovered and corrected. Sometimes the cause of the fault may be easily discovered in the process of the current state (or block) where the fault occurred. Other times, the fault may be caused at a certain state entered into or at a transition path selected at some point in the distant past (and often times in a completely different block or a completely different process). The cause of faults in such cases is not so easy to ascertain. This is because there may be hundred of possible nodes, and hundreds of possible paths, and associated actions, through which the process passed before the fault manifests itself. All pertinent possible combinations of states and paths and actions must then be examined in order to determine which is the cause. Unfortunately, current technology provides only a snap-shot view (picture) of state driven machine status at the time the fault arises, and this snap-shot view may not provide sufficient information concerning the history of process execution to enable the cause of the fault to be easily determined.

There is a need then for a mechanism to assist in the detection of the cause of a fault in a state driven machine. Preferably, this mechanism should provide sufficient historical information relating to process execution to enable the cause of the fault to be found. The procedure implementing the mechanism should further be capable of running in parallel with normal system operation or execution. Additionally, any captured historical information should be capable of being accessed or retrieved without stopping or staying normal execution of the process.

SUMMARY OF THE INVENTION

A state driven machine is logically sub-divided into a plurality of blocks. Each block includes a sub-set of a total number of processes defining operating states and transition paths for the state driven machine defined process. Plural records (also referred to as individuals) are associated with each block, with each record allocated to a certain one of a plurality of simultaneously supported process executions. A log is maintained on a per process execution basis of certain unique or selected events (such as state transitions and external actions affecting the process) which occur for that execution as it progresses from block to block. Using the information recorded in the log, it is possible to trace back along process execution to identify an origin of a fault in the process implemented by the state driven machine.

In one embodiment of the present invention, the log for a given execution is distributed across the blocks implicated during process execution. Accordingly, each record in a block associated with the process execution logs event information with respect to certain ones of those events occurring during process execution in that block. The given process execution is identified and that identification is shared across each of the records to link the distributed logs together and to their associated process execution. A separate log may further be maintained for each process execution which identifies the particular records maintaining logs that contain event information relating to the process execution.

In another embodiment, a global log for each process execution is maintained. This log stores event information with respect to certain events occurring during a certain process execution, regardless of the block. Again, the given process execution is uniquely identified and that identification is used to distinguish between the global logs maintained for plural simultaneous process executions.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
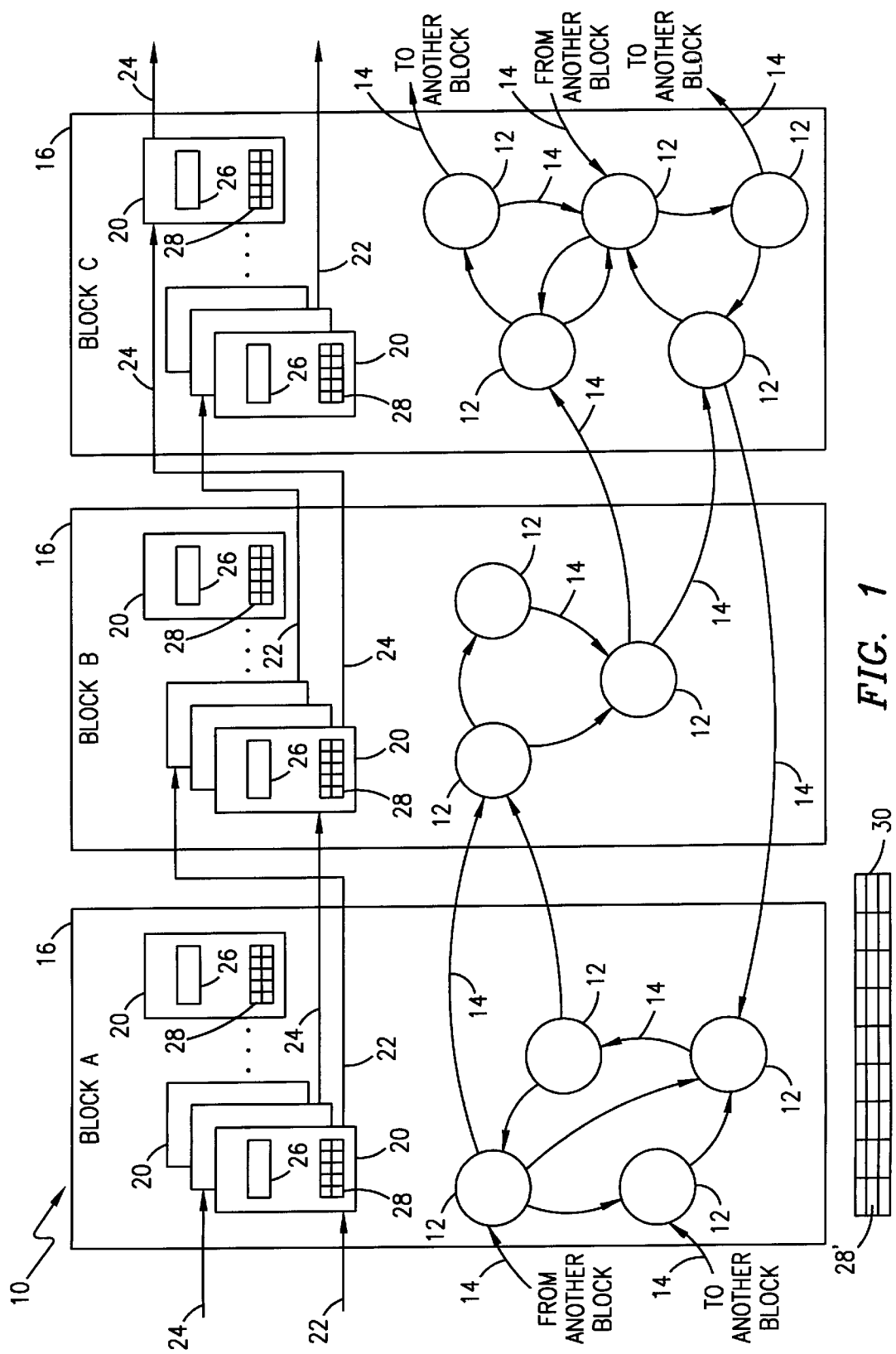
FIG. 1 is a schematic diagram of an exemplary state driven machine for a given process.

Reference is now made to FIG. 1 wherein there is shown a schematic diagram of an exemplary state driven machine 10 for a given process. The state driven machine 10 includes a plurality of potential operating states 12 and a plurality of between-state transition paths 14. At each operating state 12, the process performs a certain action, test or the like, with the result or results therefrom dictating the next state to which the process should transition. There may be more than one transition path 14 into a state 12, as well as more than one transition path out of a state. Execution of the process in one instance may use certain ones of the operating states 12, while execution in another instance with differing conditions may use different ones of the operating states.

The overall process being implemented by the state driven machine 10 is logically sub-divided into a plurality of blocks 16. Each block 16 includes a sub-set of the total number of operating states 12 and transition paths 14 present for the entire process. In accordance with this logical sub-division, certain ones of the transition paths 14 extend from one or more operating states 12 in one block 16 to one or more operating states in another block. In a manner similar to the operating states 12, execution of the process in one instance may use certain ones of the blocks 16, while execution in another instance with differing conditions may use different ones of the blocks.

A certain number of records 20 (also referred to as individuals) are associated with each block 16. The selected certain number for the records 20 corresponds to the number of simultaneous executions of the portion of the process defined by the block 16 supported by the state driven machine 10. Each time a block is implicated in the execution of the process, a certain one of the records 20 is assigned to that particular execution. Once the execution has been completed, the record 20 is released for re-assignment to a subsequent process execution. A certain execution 22 of the process then may use one record 20 in a block 16 in one instance, and later use another record of the same block in a subsequent execution 24.

If the state driven machine 10 comprises a stored program controlled telecommunications switch, for example, the state driven machine is capable of handling multiple calls in a simultaneous manner. Each of these calls, however, must have access when necessary to each of the blocks 16. Accordingly, plural records 20 are associated with each block, and a record is assigned when necessary in the processing of each call (comprising an execution 22 or 24). Once handling by the switch of a certain call has been completed, the records assigned to processing that call are released and made available for use in connection with a subsequent call. When a record in a block necessary for call handling is not available (for example, all allocated records are in use for other calls or are not currently available), call service is denied.

The records 20 store 26 information concerning the circumstances with which the associated block 16 is being implemented in accordance with the process. For example, the record 20 may store 26 information identifying the execution 22 or 24 and concerning the particular user whose actions have prompted or necessitated execution of the process through the associated block 16. More particularly, if the state driven machine 10 comprises a stored program controlled telecommunications switch, the record 20 may store 26 information identifying or concerning the particular call that is being handled through that record by the associated block 16.

The records 20 further include a log 28 storing information concerning events occurring with respect to the operating states 12 and transition paths 14 for the portion of the process comprising the associated block 16. By "events" it is meant either a state change (i.e., operation triggering a flow along one of the transition paths 14) in the block 16, or the receipt (entry) of an individual external action (signal) relating to process execution in the block (for example, an action that triggered a state change). Each event arising during execution of the block 16 results in log 28 storage of the appropriate information (e.g., old state or action name, as appropriate) into the record 20 implicated in the execution of the process.

Thus, the log 28 of the record 20 stores information concerning not only the transitions from state to state within a certain block 16, but also information to help identify the state transitions or actions leading into the certain block from other blocks. With respect to the information stored in the log 28 of the record 20 pointing to transitions from other blocks 16, the information specifically points to the particular one of the records 20 of the other blocks where information relating to the execution (e.g., 22 or 24) of the process is stored.

In another embodiment, the state driven machine 10 includes a log 30 maintained on a per execution 22 or 24 basis storing information identifying which records 20 store 28 information concerning the events of that execution. The log 30 accordingly stores information pointing to where (i.e, which record(s) 20) should be examined to obtain the event information for a given execution. In yet another alternative, the event information is not stored in a log 28 associated with each record 20. Rather, a log 28' is maintained on a per execution 22 or 24 basis for storing the event information of that execution across all of the implicated blocks 16. In this embodiment a log 28 need not necessarily be associated with a block as illustrated, but rather may be associated with each execution as illustrated with the log 28'.

Using the information stored in the logs 28, 28' or 30, it is possible, when a fault (such as a hanging) arises, for the process execution sequence to be traced from state 12 to state 12 and block 16 to block 16 back in time. Much more information is then made available to assist in cause detection than is available from the prior art snap-shot of state driven machine status taken at the time the fault arises. By analyzing the tracing and, in particular, the events (state transitions and actions) involved therewith, sufficient information may be available to enable an identification of the cause of the fault. For example, logged events may be compared against a known accurate pattern to detect discrepancies pointing to potential error locations.

To assist in both storing and retrieving the information concerning events within a block 16, the information is maintained by the logs 28, 28' or 30 in an arrayed format. For example, an eight bit, sixteen element array would have sufficient size for log 28 storage in situations where it is unlikely that the block includes more than two-hundred fifty-six different states or relevant actions. Where needed, such as with a fault producing excessive state transition looping within the block, or for the logs 28' or 30, the array implemented may be permanently or temporarily increased in size. The selection of the size of the array should, however, further take into account concerns over capturing a sufficient number of events to detect the fault without using too much memory or causing processor overloading.

In any case, the limitation placed on information storage in the logs 28, 28' or 30 is not based on time (as in some implementations), but is rather based on the execution 22 or 24 (i.e., the transaction or call at issue). Time limited storage only allows for the retention of information going back a certain amount of time. No such limitation exists with the information storage 28, 28' or 30 of the present invention. For example, the log 28 in each record 20 stores the event information for the execution within its associated block 16. The collection of the information stored in the logs 28 from all of the blocks 16 implicated in a given execution 22 or 24, or alternatively the information stored 28' or 30 for the given execution, provides all of the event related information needed to understand process execution without any restriction on the length of time or transitions taken for the process to be completed.

It is possible to implement the procedure for recording information in the logs 28, 28' or 30 with minimal impact or risk to any given block 16. A basic template sub-routine is defined, necessary variables are declared in each block 16, and the existing state machine 10 processing architecture is modified to have the defined sub-routine called before every state transition (or perhaps only certain important state transitions) and after every action (or perhaps only certain important actions) of a provider determined relevant action in the block. The use of a template structure for the sub-routine advantageously provides for the addition of identical code into each block. This facilitates understanding of the code, reduces the risk of error, and requires minimal involvement and time expenditure by the block designer.

Several PLEX examples concerning the implementation of the procedure for log 28, 28' or 30 storage of information are now presented. First, certain variables relating to the log storage are defined for each block 16:

| VARIABLE ESAARRAY (16) | 8 | DS; |
|---|---|---|
| VARIABLE ESAINDEX | 4 | DS; |
| SYMBOL VARIABLE EVENT | | DS; |

It is noted here that these variables are never to be cleared, even if the record 20 goes idle (for example, is released) or the state driven machine 10 is re-started. Accordingly, these variables are maintained by the state driven machine 10 in a memory. The arrayed format of the logs 28, 28' or 30 simply provides for over-writing of previously stored information as additional executions occur.

Second, a sub-routine is introduced:

```
!
ESA
---
TASK:    ESA, STORED THE LAST SIXTEEN EVENTS PER
         RECORD
INPUT:   EVENT
OUTPUT:  STORAGE OF EVENT IN ESAARRAY
!
BEGIN ESA;
    ESAINDEX = ESAINDEX + 1;
    ESAARRAY (ESAINDEX) = EVENT;
END ESA;
```

Third, whenever a state transition occurs within a block (such as, for example, where the statement "STATE=state" appears), the following is inserted before that transition is effectuated:

| EVENT = statename (n); | where n is a number used to distinguish identical state occurrences in a block |
|---|---|
| DO ESA; | |

A specific example of the foregoing is now presented from a state driven machine implementation in a telecommunications switch:

| EVENT = IDLE0; | !! NEW LINE !! |
|---|---|
| DO ESA; | !! NEW LINE !! |
| STATE = IDLE; | ! EXISTING LINE ! |

Fourth, whenever an entry of a signal (action) appears, a verification is made that the action is pertinent to event logging, and the following is inserted just after that action reception:

| EVENT = signalname (n); | where n is a number used to distinguish identical signal (or action) occurrences in a block |
|---|---|
| DO ESA; | |

A specific example of the foregoing is now presented from a state driven machine implementation in a telecommunications switch:

```
!
> MSCONNECTED>    MS IS CONNECTED TO VC
!
ENTER MSCONNECTED WITH
    MTAP,               ! MTA-INDIVIDUAL !
    CELLNUM,            ! CELL NUMBER !
    INGS,               ! INLET IN GS !
    GLROUTE,            ! ORIGINAL GLOBAL ROUTE NO. !
    TERMGLROUTE,        ! TERMINATING GLOBAL ROUTE NO. !
    +,
    TOBAVALUE,          ! ORIGIN FOR B-NUMBER ANALYSIS !
    ORIGCHAR,           ! ORIGIN FOR CHARGING (MBLT) !
    ORIGROUT,           ! ORIGIN FOR ROUTING (MBLT) !
    CHAINF,             ! CHARGING INFO !
    SEIZEHOUR,          ! TIME FOR SEIZURE !
    SEIZEMINUTE,
    SEIZESECOND,
    VCNUM,              ! VOICE CHANNEL NUMBER !
    VCTYPE,             ! VOICE CHANNEL TYPE !
    LOCAREACODE,        ! LOCATION AREA INDICATOR !
    LOCATIONAREA,       ! LOCATION AREA !
    VCINF = 0;          ! TIME FOR CHANNEL SEIZURE !
                        ! EXIST !
EVENT = MSCONNECTED;  !! NEW LINE !!
DO ESA;               !! NEW LINE !!
    BRANCH ON STATE
        TO MSCONNECT10 IF MSCONNECT
        ELSE TO ABNORMALEXIT;    ! EXISTING LINE !
```

It is recognized that other trouble-shooting or de-bugging tools may be available to assist in detecting faults in state driven machines 10. For example, with respect to a telecommunications switch, a known in the art trouble-shooting tool is typically provided to record (and print out) from a system-level perspective at certain designated times the most recent states, current register values, and the like. This system-level information is not, however, linked to a particular execution (or call). Accordingly, tracing down to what has occurred on a per execution (or call) basis is difficult, if not impossible. The present invention may advantageously be implemented in connection with such other known trouble-shooting or de-bugging tools such that the log 28, 28' or 30 stored information concerning events on a per execution basis is incorporated with the information provided by the other tools to give a more complete picture of state driven machine 10 operation and failure. Thus, continuing with the telecommunications switch example, a triggering of the other log to record system-level information (such as at a re-start) could be tied to further provide call-level information as stored in accordance with the present invention, thus giving a more complete picture of switch operation and failure.

Figure 2:
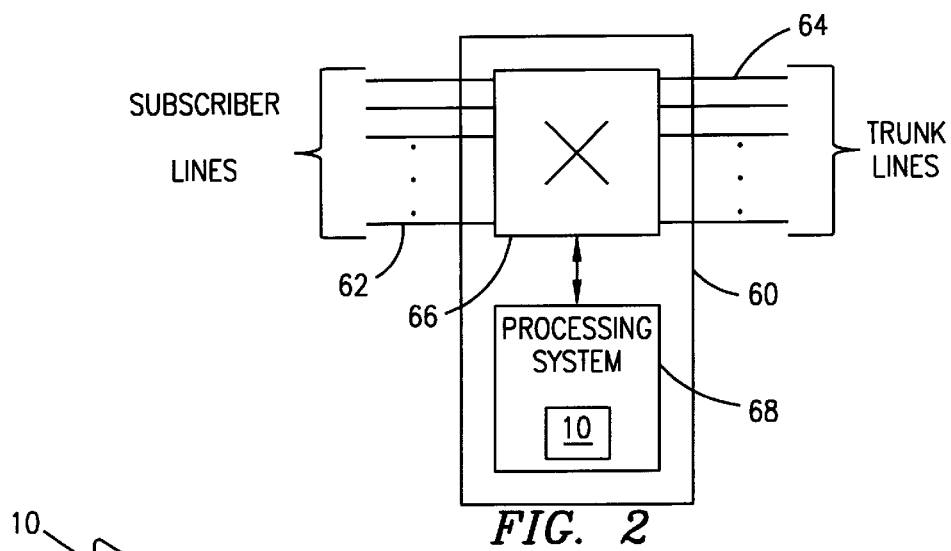
FIG. 2 is a simplified block diagram of a stored program controlled telecommunications switch.

Reference is now made to FIG. 2 wherein there is shown a simplified block diagram of a stored program controlled telecommunications switch 60. The switch 60 includes a plurality of subscriber lines 62 and a plurality of trunk lines 64. The subscriber lines 62 and trunk lines 64 are interconnected by a switching matrix 66. Operation of the switching matrix 66 is controlled by a processing system 68 which executes a process for providing telecommunications calling services. One such service comprises simple call connection services where the processing system 68 instructs the switching matrix 66 to connect one particular subscriber line 62 to one particular trunk line 64. Other telecommunications services well known to those skilled in the art are also provided by the telecommunications switch 60 pursuant to the executed process.

The process for providing telecommunications calling services that is implemented by the processing system 68 of the telecommunications switch 60 may be represented as a state driven machine 10 like that illustrated in FIG. 1. Because of the volume of call traffic that the switch 60 must handle, the process must be capable of supporting plural calls in a simultaneous manner. This means that the state driven machine 10 must also be configured to support simultaneous executions of the process. This is accomplished as described above by logically sub-dividing the operating states and transition paths of the process into a plurality of blocks 16, and providing a plurality of records 20 (also referred to as individuals) for each block. As a particular call is handled by the switch 60, the process is executed and proceeds from block to block as necessary to provide any needed services. Each block is implicated in call handling, a certain free one of the records associated with that block is allocated to the call. Following the completion of successful call handling, the allocated record is released for subsequent use in connection with another switch 60 handled call.

In accordance with the present invention, the state driven machine 10 maintains logs 28, 28' or 30 for non-volatile storage of information concerning events occurring within the state driven machine. The log 28 is maintained for a call in each record to provide event information regarding state driven machine operation within the associated block. Conversely, the log 30 stores information for a given call pointing to the logs 28 in each record for the blocks implicated by execution of the state driven machine 10 in handling the call. As another alternative, the log 28' collectively stores for a given call all of the event information regarding state driven machine operation within each of the blocks implicated in handling the call. The information is stored in each case on a per call basis. Thus, for example, the logs 28, 28' or 30 store the events comprising state transitions and actions with respect to one switch 60 handled call, and also separately store the events with respect to other simultaneously handled calls. If a failure of the state driven machine 10 should arise in connection with switch 60 operation (such as a hanging), the information thereafter retrieved from the logs 28, 28' or 30 may enable a technician to trace state driven machine operation back in time in order to find the origin of the fault.

Figure 3:
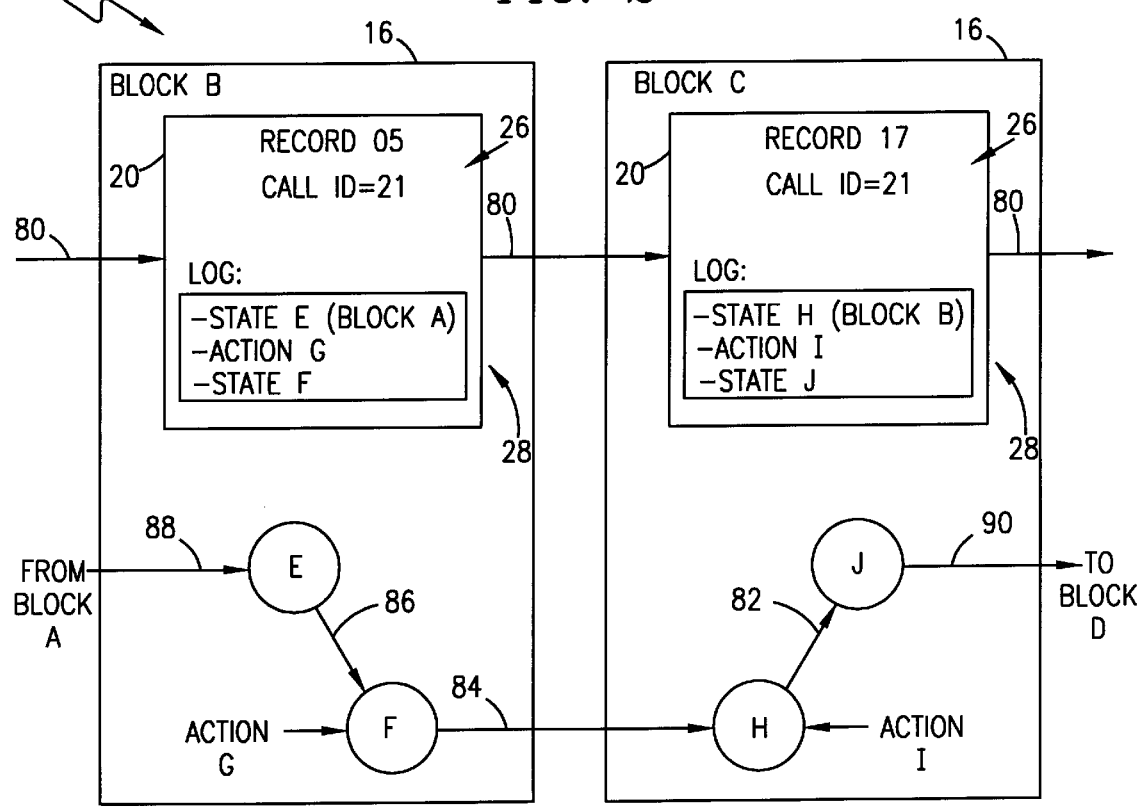
FIG. 3 is a schematic diagram of a telecommunications switch state driven machine in connection with an illustration of machine operation in connection with the present invention process for logging event information on a per call basis.
Figure 3:
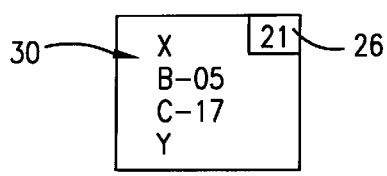
Figure 3:
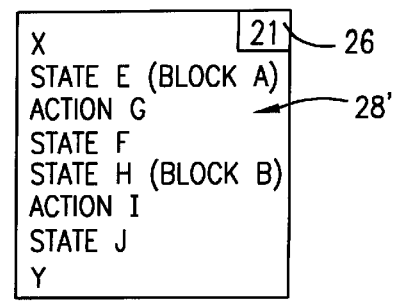

Reference is now made to FIG. 3 wherein there is shown a schematic diagram of a telecommunications switch state driven machine in connection with an illustration of machine operation in connection with the present invention process for logging event information on a per call basis. For this illustration, the complexity of the state driven machine (comprising the number of operating states, transition paths, actions, and the like) has been greatly simplified so that the logging process may be emphasized. Furthermore, only those events actually implicated in handling of the illustrated call are shown to further simplify the illustration. Lastly, while only one call is illustrated as being handled, it is understood that plural calls are simultaneously being handled by the state driven machine, and that similar logging actions are individually being taken with respect to each of those calls.

The state driven machine 10 is shown handling a certain call 80. In connection with handling that call 80, the execution of the process by the state driven machine 10 proceeds from Block A, through Block B, through Block C, and then on to Block D. Each block 16 maintains a plurality of records 20 (also referred to as individuals) which reflect the number of simultaneous executions of the process (i.e., calls handled) within the block that the machine supports. Only the single record in each block associated with the illustrated call 80 is shown. In Block B, the fifth of n available records 20 is currently allocated to call 80. Similarly, in Block C, the seventeenth of n available records is currently allocation to that same call 80. This illustrates that sequential and corresponding use of records 20 is not either a requirement of state driven machine 10 operation nor of logging operation in accordance with the present invention.

Each record 20 stores 26 information identifying the transaction to which the record has been assigned and also with which the logging of event information is concerned. In this case, the call 80 at issue has been given an identification (ID=21), and that identification comprises shared stored 26 information between the records 20 of all implicated blocks 16 for that call. Each record 20 further includes a log 28 recording the events implicated during execution of the process by the state driven machine 10 for the call 80. In the Block B record 20, for example, the log 28 therein reports a transition to State E from Block A, followed by a transition to State F, followed by an external Action G, with respect to the handling of call 80. Similarly, for Block C handling of call 80, the log 28 in its record 20 reports a transition to State H from Block B, followed by an external Action I, and a transition to State J.

If a fault (such as a hanging) should arise, the event information (state transitions and actions) stored in the logs 28 of the records 20 in each block 16 implicated in call 80 handling is available for analysis in tracing call handling back through process execution by the state driven machine 10. Knowledge of the transaction identifier (ID) allows for the retrieval of the particular one of the plural records 20 maintained at each block 16 that relate to the call 80. Once the records 20 are retrieved, the information stored in the logs 28 is retrieved and analyzed. For example, from the log 28 of the call 80 record for Block C, the stored information indicates process execution through States H and J (implicating use of transition path 82) as well as action at State H in response to external Action I. The information further indicates previous process execution in Block B. The stored information in log 28 of the call record for Block B indicates process execution through State F (implicating use of transition path 84 to Block C State H), action at State F in response to external Action G, and process execution through State E (implicating use of transition path 86). Similar tracings of process execution may be made from analysis of the records 20 associated with call 80 in other implicated blocks 16 to implicate, for example, the use of transition paths 88 and 90 with respect to Block A and Block D, respectively.

If the cause of a fault was an action taken, in this example, at State E in Block B, but the fault did not manifest itself until much later in the call 80 handling (such as in Block D), snap-shot view information taken at Block D when the fault manifests itself and is first noticed might not provide sufficient data to locate the State E, Block B fault. With the logs 28, however, the event information leads an investigator directly back to State E with respect to call 80 handling, and with further analysis along the way, sufficient data may be accumulated to detect the fault at State E. Conversely, a tracing back along the process execution for call 80 may provide the investigator with sufficient information to rule out processing actions occurring for call 80 as being the cause of the fault.

Recordation of event information in a log 28 maintained at each record 20 is not the only storage mechanism that is available. In another embodiment, a log 30 is maintained on a per call basis storing information identifying which records 20 in the blocks 16 store logged 28 information concerning the events for that call. The log 30 accordingly stores 26 an identification of the call at issue (21), as well as information pointing to where (i.e, which record(s) 20) should be examined to obtain the event information for that call (see, B-05 and C-17). The designators "X" and "Y" refer to log 30 data with respect to blocks 16 implicated in process execution prior to Block B and after Block C, respectively. In yet another alternative, the event information is not stored in a log 28 associated with each record 20. Rather, a global log 28' (which actually comprises the record 20) is maintained on a per call basis for storing the event information of that execution across all of the implicated blocks 16. The log 28' may then be referred to as a composite of the logs 28, and stores 26 an identification of the call at issue, as well as the event information for that call. The designators "X" and "Y" here refer to logged event information with respect to process execution prior to Block B and after Block C, respectively.

Although preferred embodiments of the method and apparatus of the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

What is claimed is:

1. In a state driven machine capable of handling multiple simultaneous executions of a process, a method for logging events occurring within the state driven machine on a per execution basis, comprising the steps of:
   associating each process execution of the simultaneously handled multiple process executions with a record;
   storing in the record certain event information concerning the certain process execution associated with that record; and
   performing the step of storing for each of the simultaneously handled multiple process executions.

2. The method as in claim 1 wherein the state driven machine comprises a plurality of operating states interconnected by a plurality of transition paths and responsive to actions, and wherein the stored event information comprises a recording in the record of certain transitions between operating states and occurrences of certain actions during process execution associated with that record.

3. The method as in claim 1 wherein the process is sub-divided into a plurality of blocks and wherein each execution of the process within a block is associated with a record, and wherein the step of storing comprises the step of storing in the record certain event information concerning the process execution within the block associated with that record.

4. The method as in claim 3 wherein the state driven machine comprises a plurality of operating states interconnected by a plurality of transition paths and responsive to actions, and wherein the stored event information comprises a recording in the record of certain transitions between operating states and occurrences of certain actions during process execution within the block associated with that record.

5. The method as in claim 3 further including the step of storing with respect to each process execution an identification of the record within each block that stores the event information concerning that process execution.

6. A state driven machine for executing a process, comprising:
   a plurality of operating states;
   a plurality of transition paths between operating states; and
   a plurality of records wherein each record is associated with a separate one of a plurality of simultaneous executions of the process, and wherein each record includes a first log for storing certain event information concerning the particular one of the simultaneous process executions that is associated with that record.

7. The state driven machine as in claim 6 wherein the state driven machine comprises a telecommunications switch, and each execution of the process comprises the handling of a telecommunications call.

8. The state driven machine as in claim 6 wherein the event information stored in the first log of the record comprises certain transitions between operating states and occurrences of certain actions during the process execution associated with that record.

9. The state driven machine as in claim 6 wherein the process is sub-divided into a plurality of blocks, further including:
   a plurality of records for each block, wherein each record in a block is associated with a separate one of the plurality of simultaneous executions of the process and wherein each record includes a second log for storing certain event information concerning the particular one of the simultaneous process executions within the block that is associated with that record.

10. The state driven machine as in claim 9 wherein the event information stored in the second log of each record comprises certain transitions between operating states and occurrences of certain actions during the process execution within the block that is associated with that record.

11. The state driven machine as in claim 9 further comprising a third log maintained for each process execution identifying the record within each block that stores the event information concerning that process execution.

* * * * *